United States Patent
Zhang et al.

(10) Patent No.: US 9,445,467 B2
(45) Date of Patent: Sep. 13, 2016

(54) BACKLIGHT DRIVING CIRCUIT, ELECTRONIC DEVICE AND BACKLIGHT DRIVING METHOD

(71) Applicant: SHENZHEN CHINA STAR OPTOELECTRONICS TECHNOLOGY CO., LTD., Shenzhen, Guangdong (CN)

(72) Inventors: Hua Zhang, Guangdong (CN); Fei Li, Guangdong (CN)

(*) Notice: Subject to any disclaimer, the term of this patent is extended or adjusted under 35 U.S.C. 154(b) by 0 days.

(21) Appl. No.: 14/413,165

(22) PCT Filed: Aug. 29, 2013

(86) PCT No.: PCT/CN2013/082527
§ 371 (c)(1),
(2) Date: Jan. 6, 2015

(87) PCT Pub. No.: WO2015/024277
PCT Pub. Date: Feb. 26, 2015

(65) Prior Publication Data
US 2016/0242246 A1  Aug. 18, 2016

(30) Foreign Application Priority Data

Aug. 21, 2013 (CN) .......................... 2013 1 0367731

(51) Int. Cl.
*H05B 33/08* (2006.01)
(52) U.S. Cl.
CPC ...... *H05B 33/0815* (2013.01); *H05B 33/0824* (2013.01)
(58) Field of Classification Search
None
See application file for complete search history.

(56) References Cited

U.S. PATENT DOCUMENTS

| | | | | |
|---|---|---|---|---|
| 4,255,668 A * | 3/1981 | Harrison | ................. | H05G 1/22 307/107 |
| 5,947,093 A * | 9/1999 | Ward | ....................... | F02P 3/04 123/169 EL |
| 2006/0186955 A1* | 8/2006 | Quilter | ..................... | H03F 1/32 330/10 |
| 2009/0295300 A1* | 12/2009 | King | ................. | H05B 33/0815 315/209 R |
| 2010/0176733 A1* | 7/2010 | King | ................. | H05B 37/0245 315/158 |
| 2012/0042588 A1* | 2/2012 | Erickson, Jr. | ..... | H01L 31/02021 52/173.3 |
| 2013/0119875 A1* | 5/2013 | Dearborn | .......... | H05B 33/0815 315/186 |

FOREIGN PATENT DOCUMENTS

| | | |
|---|---|---|
| CN | 1370035 A | 9/2002 |
| CN | 102783253 A | 11/2012 |
| EP | 2293653 A | 3/2011 |

* cited by examiner

*Primary Examiner* — Crystal L Hammond

(57) ABSTRACT

A backlight driving circuit includes a LED driving chip (10) for outputting a PWM signal, a power port (20), a voltage conversion unit (30), a first, a second, and a third switch unit (50, 60, 70), and a level conversion unit (40). The voltage conversion unit (30) includes a primary unit (31) and a secondary winding (32). The first switch unit (50) is connected to the power port (20) and the primary unit (31). The second switch unit (60), the secondary winding (32) and a first LED string (21) forms a first circuit loop (LP1). The first and the second switch unit (50, 60) are turned on or off when receiving the PWM signal. The third switch unit (70), the primary winding (31), and a second LED string (22) form a second circuit loop (LP2). The voltage conversion unit output a reversed PWM signal to the third switch unit (70).

14 Claims, 3 Drawing Sheets

US 9,445,467 B2

BACKLIGHT DRIVING CIRCUIT, ELECTRONIC DEVICE AND BACKLIGHT DRIVING METHOD

FIELD OF THE INVENTION

The present invention relates to a driving circuit, and more particularly, to a backlight driving circuit and an electronic device with the backlight driving circuit, and a backlight driving method.

BACKGROUND OF THE INVENTION

Nowadays, light-emitting diode (LED) as a backlight source of mobile phones, televisions, computers, and other electronic devices, are more popular. In general, the luminance of light emitted by the LED needs to be adjusted by manually or automatically follows the changes of the environment, as is known, LED is driven by a backlight driving circuit, and the backlight driving circuit changes a voltage output to the LED to change the luminance of the light emitted by the LED. As shown in FIG. 1, a common backlight driving circuit 1' includes a LED driving chip 10', a power port 20', an inductor L, and a metal-oxide-semiconductor field-effect transistor (MOSFET) Q. The power port 20' is used to receive a power voltage Vin. The LED driving chip 10' is used to output a pulse-width modulation (PWM) signal to control the MOSFET Q to turn on or off periodically. Therein, when the MOSFET Q is turned on, the power voltage Vin is applied to two ends of the inductor L, the current flowing through the inductor L is enhanced, and the inductor L store energy; when the MOSFET Q is turned off, the two ends of the inductor L produce a backward inducted voltage connected with the power voltage Vin in series, thus providing a relative higher output voltage Vout to a LED module 2 together. Therein, Vout=Vin(1−D), D is a duty cycle of the PWM signal output by the LED driving chip 10'.

However, in general technique, the output voltage Vout is only determined by the duty cycle D of the PWM signal, when an amount of LEDs connected in series of the LED module 2' is much more, the output voltage Vout is also needed more larger, and the duty cycle D is also needed to be a more larger value. When the value of the duty cycle D is larger, a duration that the MOSFET Q is turned on is very long, because the current flowing through the inductor is enlarged linear, then the current flowing through the MOSFET Q and the inductor L is larger, and the power loss of the whole circuit is large and the temperature of elements is high and the elements are easy to be damaged.

SUMMARY OF THE INVENTION

The present invention provides a backlight driving circuit, an electronic device and a backlight driving method, which capable of driving a LED module include a number of LEDs by using a relative lower voltage.

A backlight driving circuit used to drive a light-emitting diode (LED) module of an electronic device to emit light, the backlight driving circuit comprises a LED driving chip, a power port configured to receive a power voltage, wherein, the LED driving chip comprises a control terminal, the LED driving chip output a pulse-width modulation (PWM) signal via the control terminal; the LED module comprises a first LED string and a second LED string, wherein the backlight driving circuit further comprising: a voltage conversion unit comprising a primary winding and a secondary winding; a first switch unit electrically connected between the power port and the primary winding of the voltage conversion unit; a second switch unit forms a first circuit loop with the secondary winding of the voltage conversion unit, and the first LED string; a third switch unit forms a second circuit loop with the primary winding of the voltage conversion unit and the second LED string; and a level conversion unit connected between the control terminal of the LED driving chip and the third switch unit, and configured to receive the PWM signal output by the control terminal of the LED driving chip and reverse a voltage level of the PWM signal, and output the reversed PWM signal to the third switch unit to control the third unit to turn on or off periodically; wherein the first switch unit and the second switch unit are both connected to the control terminal of the LED driving chip, and configured to receive the PWM signal output by the control terminal and to turn on or off periodically accordingly; in one period of the PWM signal, when the first switch unit and the second switch unit are turned on, the third switch unit is turned off, when the first switch unit and the second switch unit are turned off, the third switch unit is turned on.

Therein, the first switch unit, the second switch unit, and the third switch unit respectively are a first N-channel metal oxide semiconductor field effect transistors (NMOSFET), a second NMOSFET, and a third NMOSFET; a source of the first NMOSFET is connected to the power port, a drain of the first NMOSFET is connected to a dotted terminal of the primary winding, a gate of the first NMOSFET is connected to the control terminal of the LED driving chip; a source of the second NMOSFET is connected to a dotted terminal of the secondary winding, a drain of the second NMOSFET is connected to an anode input terminal of the first LED string, a gate of the second NMOSFET is connected to the control terminal of the LED driving chip, thus, the second NMOSFET, the secondary winding, and the first LED string constitutes the first circuit loop; a drain of the third NMOSFET is connected to a dotted terminal of the primary winding, a source of the third NMOSFET is connected to a cathode terminal of the second LED string, a gate of the third NMOSFET is connected to the level conversion unit; a non-dotted terminal of the primary winding is connected to the anode input terminal of the second LED string, thus, the third NMOSFET, the primary winding, and the second LED string constitutes the second circuit loop.

Therein, the level conversion unit is a comparator, the comparator comprises an inverting input port, a non-inverting input port, and an output port, the inverting input port is connected to the control terminal of the LED driving chip, the non-inverting input port is connected to a reference voltage, the output port is connected to the gate of the third NMOSFET, wherein the reference voltage is greater than a low voltage of the PWM signal and is less than a high voltage of the PWM signal.

Therein, when the PWM signal output by the LED driving chip controls the first switch unit and the second switch unit to turn on, the power port provides power to the primary winding via the first switch unit which is turned on, the secondary winding induces the voltage of the primary winding and then produces an induced voltage, the first LED string is driven to emit light by the induced voltage accordingly.

Therein, when the PWM signal output by the LED driving chip controls the first switch unit and the second switch unit to turn off, the reversed PWM signal output by the level conversion unit controls the third switch unit to turn on, the primary winding produces a backward induced voltage and the second LED string is driven to emit light by the backward induced voltage produced by the primary winding.

Therein, the cathode terminal of the first LED string is connected to the anode input terminal of the second LED string and is grounded, the non-dotted terminal of the primary winding is connected to the non-dotted terminal of the secondary winding and is grounded.

An electronic device includes a backlight driving circuit and a light-emitting diode (LED) module, wherein the backlight driving circuit is configured to drive the LED to emit light, the backlight driving circuit comprises a LED driving chip, a power port configured to receive a power voltage, wherein, the LED driving chip comprises a control terminal, the LED driving chip output a pulse-width modulation (PWM) signal via the control terminal; the LED module comprises a plurality of LEDs, wherein the backlight driving circuit further comprising: a voltage conversion unit comprising a primary winding and a secondary winding; a first switch unit electrically connected between the power port and the primary winding of the voltage conversion unit; a second switch unit forms a first circuit loop with the secondary winding of the voltage conversion unit, and a first LED string constituted by a part of LEDs of the LED module; a third switch unit forms a second circuit loop with the primary winding of the voltage conversion unit and a second LED string constituted by another part of LEDs of the LED module; and a level conversion unit connected between the control terminal of the LED driving chip and the third switch unit, and configured to receive the PWM signal output by the control terminal of the LED driving chip and reverse a voltage level of the PWM signal, and output the reversed PWM signal to the third switch unit to control the third unit to turn on or off periodically; wherein the first switch unit and the second switch unit are both connected to the control terminal of the LED driving chip, and configured to receive the PWM signal output by the control terminal and to turn on or off periodically accordingly; in one period of the PWM signal, when the first switch unit and the second switch unit are turned on, the third switch unit is turned off, when the first switch unit and the second switch unit are turned off, the third switch unit is turned on.

Therein, the first switch unit, the second switch unit, and the third switch unit respectively are a first N-channel metal oxide semiconductor field effect transistors (NMOSFET), a second NMOSFET, and a third NMOSFET; a source of the first NMOSFET is connected to the power port, a drain of the first NMOSFET is connected to a dotted terminal of the primary winding, a gate of the first NMOSFET is connected to the control terminal of the LED driving chip; a source of the second NMOSFET is connected to a dotted terminal of the secondary winding, a drain of the second NMOSFET is connected to an anode input terminal of the first LED string, a gate of the second NMOSFET is connected to the control terminal of the LED driving chip, thus, the second NMOSFET, the secondary winding, and the first LED string constitutes the first circuit loop; a drain of the third NMOSFET is connected to a dotted terminal of the primary winding, a source of the third NMOSFET is connected to a cathode terminal of the second LED string, a gate of the third NMOSFET is connected to the level conversion unit; a non-dotted terminal of the primary winding is connected to the anode input terminal of the second LED string, thus, the third NMOSFET, the primary winding, and the second LED string constitutes the second circuit loop.

Therein, the level conversion unit is a comparator, the comparator comprises an inverting input port, a non-inverting input port, and an output port, the inverting input port is connected to the control terminal of the LED driving chip, the non-inverting input port is connected to a reference voltage, the output port is connected to the gate of the third NMOSFET, wherein the reference voltage is greater than a low voltage of the PWM signal and is less than a high voltage of the PWM signal.

Therein, wherein when the PWM signal output by the LED driving chip controls the first switch unit and the second switch unit to turn on, the power port provides power to the primary winding via the first switch unit which is turned on, the secondary winding induces the voltage of the primary winding and then produces an induced voltage, the first LED string is driven to emit light by the induced voltage accordingly.

Therein, when the PWM signal output by the LED driving chip controls the first switch unit and the second switch unit to turn off, the reversed PWM signal output by the level conversion unit controls the third switch unit to turn on, the primary winding produces a backward induced voltage and the second LED string is driven to emit light by the backward induced voltage produced by the primary winding.

Therein, the cathode terminal of the first LED string is connected to the anode input terminal of the second LED string and is grounded, the non-dotted terminal of the primary winding is connected to the non-dotted terminal of the secondary winding and is grounded.

Therein, the electronic device is one selected from a group consist of a mobile phone, a tablet computer, a display, and a television.

A backlight driving method used to drive a LED module to emit light, the LED module comprises a first LED string and a second LED string, wherein the method comprising: controlling a first circuit loop formed by the first LED string and a secondary winding of the voltage conversion unit to turn on and controlling a second circuit loop formed by a second LED string and a primary winding of the voltage conversion unit to cut off; Providing a power voltage to the primary winding to cause the secondary winding to induce the power voltage to produce an induced voltage to drive the first LED string to emit light; controlling the first circuit loop to cut off and controlling the second circuit loop to turn on; and producing a backward induced voltage to drive the second LED string to emit light via the primary winding.

The backlight driving circuit, an electronic device and a backlight driving method of the present invention capable of driving a LED module include a number of LEDs and do not need to increase a duty cycle of a PWM signal.

DETAILED DESCRIPTION OF THE PREFERRED EMBODIMENTS

Figure 1:
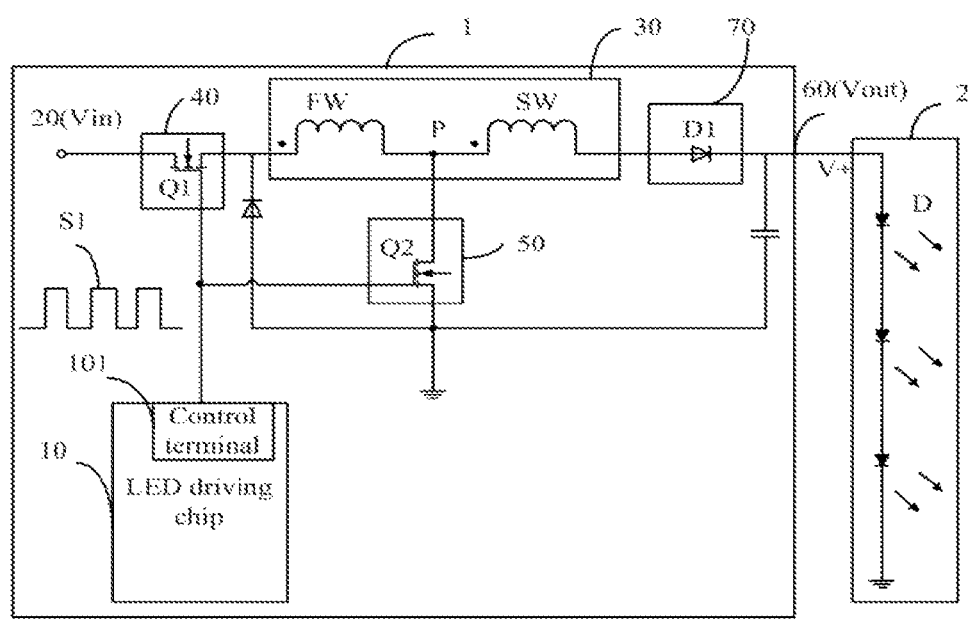
FIG. 1 illustrates a circuit diagram of a backlight driving circuit of a prior art.
Figure 2:
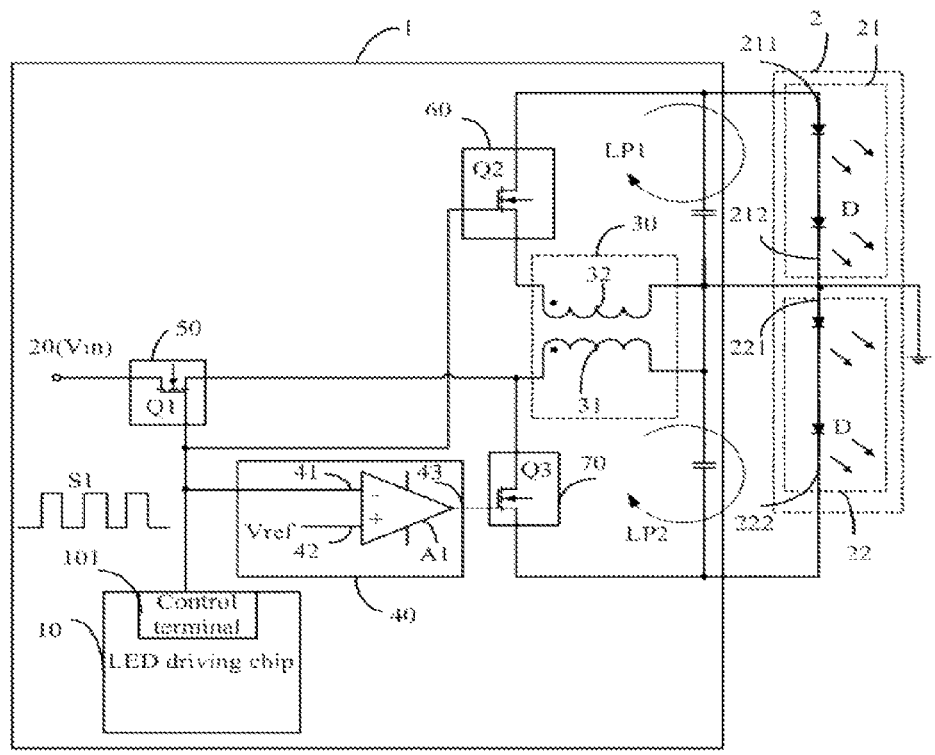
FIG. 2 illustrates a circuit diagram of a backlight driving circuit of an embodiment.

Referring to FIG. 2, illustrates a circuit diagram of a backlight driving circuit 1 of the present invention. The backlight driving circuit 1 is used to drive a light-emitting diode (LED) module 2 to emit light. The LED module 2 includes a first LED string 21 and a second LED string 22. The first LED string 21 and the second LED string 22 are connected to each other end to end to form the LED module 2 including a number of LED D connected in series.

The backlight driving circuit 1 includes a LED driving chip 10, a power port 20, a voltage conversion unit 30, a level conversion unit 40, a first switch unit 50, a second switch unit 60, and a third switch unit 70. Therein, the power port 20 is used to receive a power voltage Vin. The power port 20 can be connected to a battery or a power adapter connected to a main supply to obtain the power voltage Vin.

The voltage conversion unit 30 includes a primary winding 31 and a secondary winding 32.

The first switch unit 50 is electrically connected between the power port 20 and the primary winding 31 of the voltage conversion unit 30.

The second switch unit 60, the secondary winding 32 of the voltage conversion unit 30, and the first LED string 21 form a first circuit loop LP1. The third switch unit 70, the primary winding 31 of the voltage conversion unit 30, and the second LED string 22 form a second circuit loop LP2.

The LED driving chip 10 includes a control terminal 101, the control terminal 101 is connected to the first switch unit 50, the second switch unit 60, and the level conversion unit 40, the LED driving chip 10 is used to output a pulse-width modulation (PWM) signal S1 with a certain duty cycle D via the control terminal 101 to control the first switch unit 50 and the second switch unit 60 simultaneous to turn on or off periodically.

The level conversion unit 40 is used to receive the PWM signal S1 output by the control terminal 101 of the LED driving chip 10 and reverse the voltage level of the PWM signal S1, namely, the level conversion unit 40 converts a high voltage level of the PWM signal S1 to a low voltage level, and converts the low voltage level of the PWM signal Si to the high voltage level.

The level conversion unit 40 is also connected to the third switch unit 70, and output the reversed PWM signal S1 to the third switch unit 70 to control the third switch unit 70 to turn off or on periodically. Therein, in one period of the PWM signal S1, when the first switch unit 50 and the second switch unit 60 are turned on, the third switch unit 60 is turned off, when the first switch unit 50 and the second switch unit 60 are turned off, the third switch unit 60 is turned on.

Therein, when the PWM signal Si output by the LED driving chip 10 controls the first switch unit 50 and the second switch unit 60 to turn on, the power voltage Vin received by the power port 20 is provided to the primary winding 31 of the voltage conversion unit 30 via the first switch unit 50 which is turned on. The secondary winding 32 induces the voltage of the primary winding 31 and produces an induced voltage, then the first LED string 21 forming the second circuit loop LP2 combined with the secondary winding 32 and the second switch unit 60 is driven to emit light by the induced voltage output by the secondary winding 32.

When the PWM signal S1 output by the LED driving chip 10 controls the first switch unit 50 and the second switch unit 60 to turn off, because the level conversion unit 40 reverses the voltage level of the PWM signal S1, the reversed PWM signal S1 output by the level conversion unit 40 controls the third switch unit 70 to turn on. At this time, the primary winding 31 produces a backward inducted voltage, because the third switch unit 70 is turned on, the second LED string 22 forming the first circuit loop LP2 combined with the primary winding 31 and the third switch unit 70 is driven to emit light by the backward induced voltage output by the primary winding 31.

Therefore, in the embodiment, during a period of the PWM signal S1, the first LED string 21 and the second LED string 22 are respectively driven to emit light. Then, the power voltage Vin received by the power port 20 is converted to two switching power supply signals with reversed voltage level and the two switching power supply signals are respectively provided to the first LED string 21 and the second LED string 22. Because the LED module 20 is divided to the first LED string 21 and the second LED string 22 to be powered, thus decreasing the driving voltage for the LED module 20, namely, decreasing the duty cycle of the PWM signal S1, which protecting the elements effectively.

In detail, as shown in FIG. 2, the first switch unit 50, the second switch unit 60, and the third switch unit 70 respectively are N-channel metal oxide semiconductor field effect transistors (NMOSFETs) Q1, Q2, and Q3. The first LED string 21 includes an anode input terminal 211 and a cathode terminal 212, the second LED string 22 includes an anode input terminal 221 and a cathode terminal 222. The cathode terminal 212 of the first LED string 21 is connected to the anode input terminal 221 of the second LED string 22, thus, the first LED string 21 and the second LED string 22 are connected to each other end to end to constitute the LED module 2.

A source and a drain of the NMOSFET Q1 are respectively connected to the power port 20 and a dotted terminal of the primary winding 31, a gate of the NMOSFET Q1 is connected to the control terminal 101 of the LED driving chip 10. Therein, the voltage conversion unit 30 is a transformer.

A source and a drain of the NMOSFET Q2 are respectively connected to a dotted terminal of the secondary winding 32 and the anode input terminal 211 of the first LED string 21, a gate of the NMOSFET Q2 is connected to the control terminal 101 of the LED driving chip 10. Thus, the NMOSFET Q2, the secondary winding 32, and the first LED string 21 constitutes the first circuit loop LP1.

A drain and a source of the NMOSFET Q3 are respectively connected to a dotted terminal of the primary winding 31 and the cathode terminal of the second LED string 22, a gate of the NMOSFET Q3 is connected to the level conversion unit 40. A non-dotted terminal of the primary winding 31 is connected to the anode input terminal 221 of the second LED string 22. Thus, the NMOSFET Q3, the primary winding 31, and the second LED string 22 constitutes the second circuit loop LP2.

Therein, the cathode terminal 212 of the first LED string 21 is connected to the anode input terminal 221 of the second LED string 22 and is also grounded. Therefore, the non-dotted terminal of the primary winding 31 is connected to the non-dotted terminal of the secondary winding 32 and is grounded.

The level conversion unit 40 is a comparator A1, the comparator A1 includes an inverting input port 41, a non-inverting input port 42, and an output port 43. The inverting input port 41 is connected to the control terminal 101 of the LED driving chip 10. The non-inverting input port 42 is connected to a reference voltage Vref, the output port 43 is connected to the gate of the NMOSFET Q2.

Therein, the reference voltage Vref is greater than the low voltage of the PWM signal S1 and is less than the high voltage of the PWM signal S1.

Therefore, when the PWM signal S1 is at high voltage and controls the NMOSFET Q1 and NMOSFET Q3 to turn on, the power port provides power to the primary winding 31 via the NMOSFET Q1 which is turned on. The secondary winding 32 induces the voltage of the primary winding 32 and then produces a induced voltage, and the induced voltage is formed by the dotted terminal of the secondary winding 32 is positive and the non-dotted terminal of the secondary winding 32 is negative. Because the NMOSFET Q3 is turned on, thus the induced voltage produced by the secondary winding 32 powers the first LED string 21.

At the same time, the comparator A1 compares the high voltage of the PWM signal S1 received by the inverting input port 41 is greater than the reference voltage Vref and produces a low voltage signal, thus controlling the NMOSFET Q2 to turn off, the circuit loop LP2 including the second LED string 22 is cut off, the second LED string 22 does not emit the light.

When the PWM signal S1 is at low voltage, the NMOSFET Q1 and NMOSFET Q3 are turned off accordingly. At this time, the primary winding 31 produces a backward induced voltage, namely, the dotted terminal of the primary winding 31 is negative and the non-dotted terminal of the primary winding 31 is positive. At the same time, the comparator A1 compares the low voltage of the PWM signal S1 received by the inverting input port 41 is less than the reference voltage Vref and produces a high voltage signal, thus controlling the NMOSFET Q2 to turn on, the circuit loop LP2 including the second LED string 22 is turned on, the second LED string 22 is driven to emit light by the backward induced voltage produced by the primary winding 31.

In another embodiment, the NMOSFETs Q1, Q2, Q3 can be instead by negative-positive-negative bipolar junction transistors.

Therein, the backlight driving circuit 1 as shown in FIG. 2 also includes other circuit elements, because them are unrelated to the present invention, the description about them are omitted.

Figure 3:
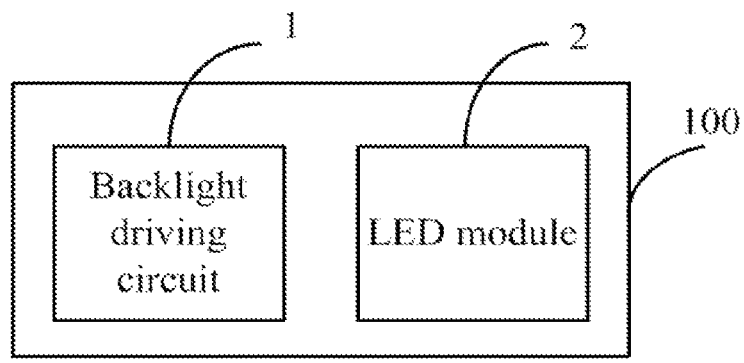
FIG. 3 illustrates a block diagram of an electronic device of an embodiment.

Referring to FIG. 3, an electronic device 100 including the backlight driving circuit 1 is illustrated. The electronic device 100 includes the backlight driving circuit 1, the LED module 2, and other necessary elements. The electronic device 100 can be a mobile phone, a tablet computer, a display, a television, or other electronic devices.

Figure 4:
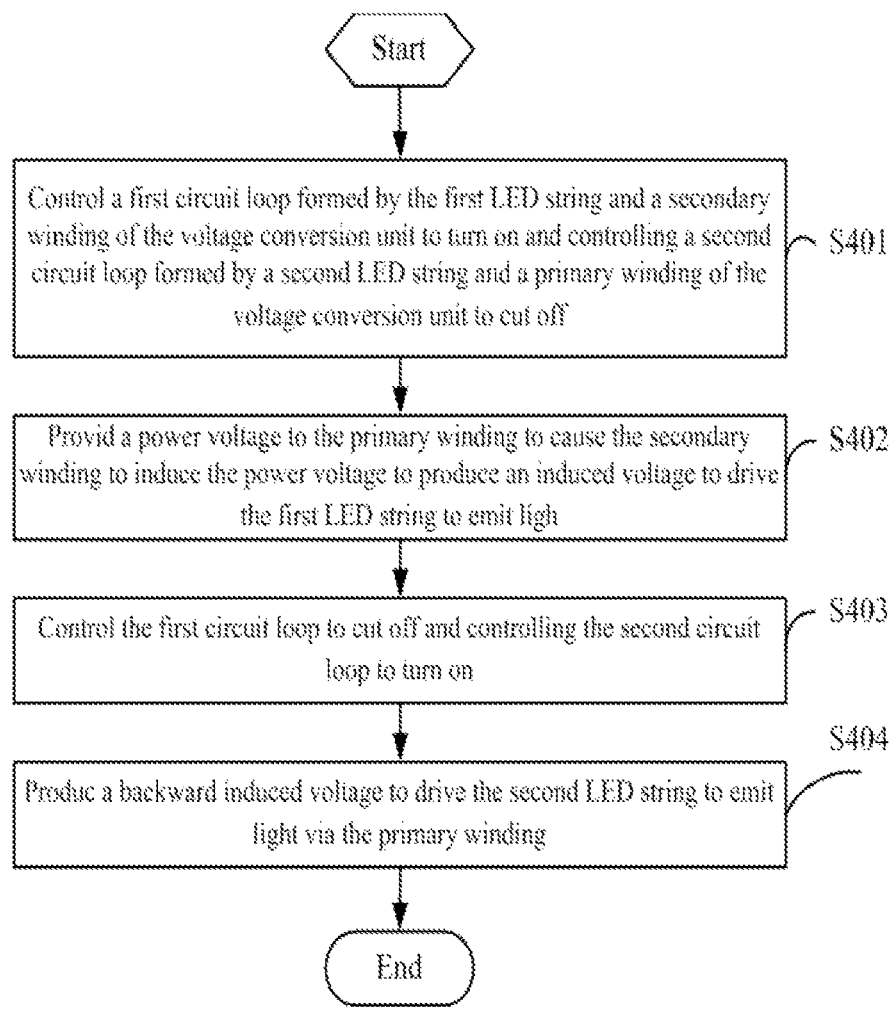
FIG. 4 illustrates a flowchart of a backlight driving method of an embodiment.

Referring to FIG. 4, a flowchart of a backlight driving method of the present invention is illustrated. The backlight driving method is used to drive a LED module 2 to emit light, the LED module 2 includes a first LED string 21 and a second LED string 22, the first LED string 21 forms a first circuit loop LP1 with a secondary winding 32 of a voltage conversion unit 30, the second LED string 22 forms a second circuit loop LP2 with a primary winding 31 of the voltage conversion unit 30. At first, controlling the first circuit loop LP1 formed by the first LED string 21 and the secondary winding 32 of the voltage conversion unit 30 to turn on and controlling the second circuit loop LP2 formed by the second LED string 22 and the primary winding 31 of the voltage conversion unit 30 to cut off (S401).

Providing the power voltage to the primary winding 31 to cause the secondary winding to induce the power voltage to produce an induced voltage and then drive the first LED string 21 to emit light (S402).

Controlling the first circuit loop LP1 to cut off and controlling the second circuit loop LP2 to turn on (S403).

The primary winding 31 produces backward induced voltage to drive the second LED string located in the second circuit loop LP2 to emit light (S404).

In detail, the backlight driving method is applied in the backlight driving circuit 1 as shown in FIG. 2.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A backlight driving circuit, configured to drive a light-emitting diode (LED) module of an electronic device to emit light, comprising a LED driving chip, a power port configured to receive a power voltage, the LED driving chip comprising a control terminal, the LED driving chip output a pulse-width modulation (PWM) signal via the control terminal; the LED module comprising a first LED string and a second LED string, wherein the backlight driving circuit further comprises:
a voltage conversion unit comprising a primary winding and a secondary winding;
a first switch unit electrically connected between the power port and the primary winding of the voltage conversion unit;
a second switch unit forms a first circuit loop with the secondary winding of the voltage conversion unit, and the first LED string;
a third switch unit forms a second circuit loop with the primary winding of the voltage conversion unit and the second LED string; and
a level conversion unit connected between the control terminal of the LED driving chip and the third switch unit, and configured to receive the PWM signal output by the control terminal of the LED driving chip and reverse a voltage level of the PWM signal, and output the reversed PWM signal to the third switch unit to control the third unit to turn on or off periodically;
wherein the first switch unit and the second switch unit are both connected to the control terminal of the LED driving chip, and configured to receive the PWM signal output by the control terminal and to turn on or off periodically accordingly; in one period of the PWM signal, when the first switch unit and the second switch unit are turned on, the third switch unit is turned off, when the first switch unit and the second switch unit are turned off, the third switch unit is turned on.

2. The backlight driving circuit of claim 1, wherein the first switch unit, the second switch unit, and the third switch unit respectively are a first N-channel metal oxide semiconductor field effect transistors (NMOSFET), a second NMOSFET, and a third NMOSFET; a source of the first NMOSFET is connected to the power port, a drain of the first NMOSFET is connected to a dotted terminal of the primary winding, a gate of the first NMOSFET is connected to the control terminal of the LED driving chip; a source of the second NMOSFET is connected to a dotted terminal of the secondary winding, a drain of the second NMOSFET is connected to an anode input terminal of the first LED string, a gate of the second NMOSFET is connected to the control terminal of the LED driving chip, thus, the second NMOSFET, the secondary winding, and the first LED string constitutes the first circuit loop; a drain of the third NMOSFET is connected to a dotted terminal of the primary winding, a source of the third NMOSFET is connected to a cathode terminal of the second LED string, a gate of the third NMOSFET is connected to the level conversion unit; a non-dotted terminal of the primary winding is connected to the anode input terminal of the second LED string, thus, the third NMOSFET, the primary winding, and the second LED string constitutes the second circuit loop.

3. The backlight driving circuit of claim 2, wherein the level conversion unit is a comparator, the comparator comprises an inverting input port, a non-inverting input port, and an output port, the inverting input port is connected to the control terminal of the LED driving chip, the non-inverting input port is connected to a reference voltage, the output port is connected to the gate of the third NMOSFET, wherein the reference voltage is greater than a low voltage of the PWM signal and is less than a high voltage of the PWM signal.

4. The backlight driving circuit of claim 1, wherein when the PWM signal output by the LED driving chip controls the first switch unit and the second switch unit to turn on, the power port provides power to the primary winding via the first switch unit which is turned on, the secondary winding induces the voltage of the primary winding and then produces an induced voltage, the first LED string is driven to emit light by the induced voltage accordingly.

5. The backlight driving circuit of claim 1, wherein when the PWM signal output by the LED driving chip controls the first switch unit and the second switch unit to turn off, the reversed PWM signal output by the level conversion unit controls the third switch unit to turn on, the primary winding produces a backward induced voltage and the second LED string is driven to emit light by the backward induced voltage produced by the primary winding.

6. The backlight driving circuit of claim 2, wherein the cathode terminal of the first LED string is connected to the anode input terminal of the second LED string and is grounded, the non-dotted terminal of the primary winding is connected to the non-dotted terminal of the secondary winding and is grounded.

7. An electronic device, comprising a backlight driving circuit and a light-emitting diode (LED) module, wherein the backlight driving circuit is configured to drive the LED to emit light, the backlight driving circuit comprises a LED driving chip, a power port configured to receive a power voltage, wherein, the LED driving chip comprises a control terminal, the LED driving chip output a pulse-width modulation (PWM) signal via the control terminal; the LED module comprises a plurality of LEDs, wherein the backlight driving circuit further comprises:
 a voltage conversion unit comprising a primary winding and a secondary winding;
 a first switch unit electrically connected between the power port and the primary winding of the voltage conversion unit;
 a second switch unit forms a first circuit loop with the secondary winding of the voltage conversion unit, and a first LED string constituted by a part of LEDs of the LED module;
 a third switch unit forms a second circuit loop with the primary winding of the voltage conversion unit and a second LED string constituted by another part of LEDs of the LED module; and
 a level conversion unit connected between the control terminal of the LED driving chip and the third switch unit, and configured to receive the PWM signal output by the control terminal of the LED driving chip and reverse a voltage level of the PWM signal, and output the reversed PWM signal to the third switch unit to control the third unit to turn on or off periodically;
 wherein the first switch unit and the second switch unit are both connected to the control terminal of the LED driving chip, and configured to receive the PWM signal output by the control terminal and to turn on or off periodically accordingly; in one period of the PWM signal, when the first switch unit and the second switch unit are turned on, the third switch unit is turned off, when the first switch unit and the second switch unit are turned off, the third switch unit is turned on.

8. The electronic device of claim 7, wherein the first switch unit, the second switch unit, and the third switch unit respectively are a first N-channel metal oxide semiconductor field effect transistors (NMOSFET), a second NMOSFET, and a third NMOSFET; a source of the first NMOSFET is connected to the power port, a drain of the first NMOSFET is connected to a dotted terminal of the primary winding, a gate of the first NMOSFET is connected to the control terminal of the LED driving chip; a source of the second NMOSFET is connected to a dotted terminal of the secondary winding, a drain of the second NMOSFET is connected to an anode input terminal of the first LED string, a gate of the second NMOSFET is connected to the control terminal of the LED driving chip, thus, the second NMOSFET, the secondary winding, and the first LED string constitutes the first circuit loop; a drain of the third NMOSFET is connected to a dotted terminal of the primary winding, a source of the third NMOSFET is connected to a cathode terminal of the second LED string, a gate of the third NMOSFET is connected to the level conversion unit; a non-dotted terminal of the primary winding is connected to the anode input terminal of the second LED string, thus, the third NMOSFET, the primary winding, and the second LED string constitutes the second circuit loop.

9. The electronic device of claim 8, wherein the level conversion unit is a comparator, the comparator comprises an inverting input port, a non-inverting input port, and an output port, the inverting input port is connected to the control terminal of the LED driving chip, the non-inverting input port is connected to a reference voltage, the output port is connected to the gate of the third NMOSFET, wherein the reference voltage is greater than a low voltage of the PWM signal and is less than a high voltage of the PWM signal.

10. The electronic device of claim 7, wherein when the PWM signal output by the LED driving chip controls the first switch unit and the second switch unit to turn on, the power port provides power to the primary winding via the first switch unit which is turned on, the secondary winding induces the voltage of the primary winding and then produces an induced voltage, the first LED string is driven to emit light by the induced voltage accordingly.

11. The electronic device of claim 7, wherein when the PWM signal output by the LED driving chip controls the first switch unit and the second switch unit to turn off, the reversed PWM signal output by the level conversion unit controls the third switch unit to turn on, the primary winding produces a backward induced voltage and the second LED string is driven to emit light by the backward induced voltage produced by the primary winding.

12. The electronic device of claim 8, wherein the cathode terminal of the first LED string is connected to the anode input terminal of the second LED string and is grounded, the non-dotted terminal of the primary winding is connected to the non-dotted terminal of the secondary winding and is grounded.

13. The electronic device of claim 8, wherein the electronic device is one selected from a group consist of a mobile phone, a tablet computer, a display, and a television.

14. A backlight driving method, configured to drive a LED module to emit light, the LED module comprising a first LED string and a second LED string, wherein the method comprises:
- controlling a first circuit loop formed by the first LED string and a secondary winding of the voltage conversion unit to turn on and controlling a second circuit loop formed by a second LED string and a primary winding of the voltage conversion unit to cut off;
- providing a power voltage to the primary winding to cause the secondary winding to induce the power voltage to produce an induced voltage to drive the first LED string to emit light;
- controlling the first circuit loop to cut off and controlling the second circuit loop to turn on; and
- producing a backward induced voltage to drive the second LED string to emit light via the primary winding.

* * * * *